United States Patent Office 3,450,342
Patented June 17, 1969

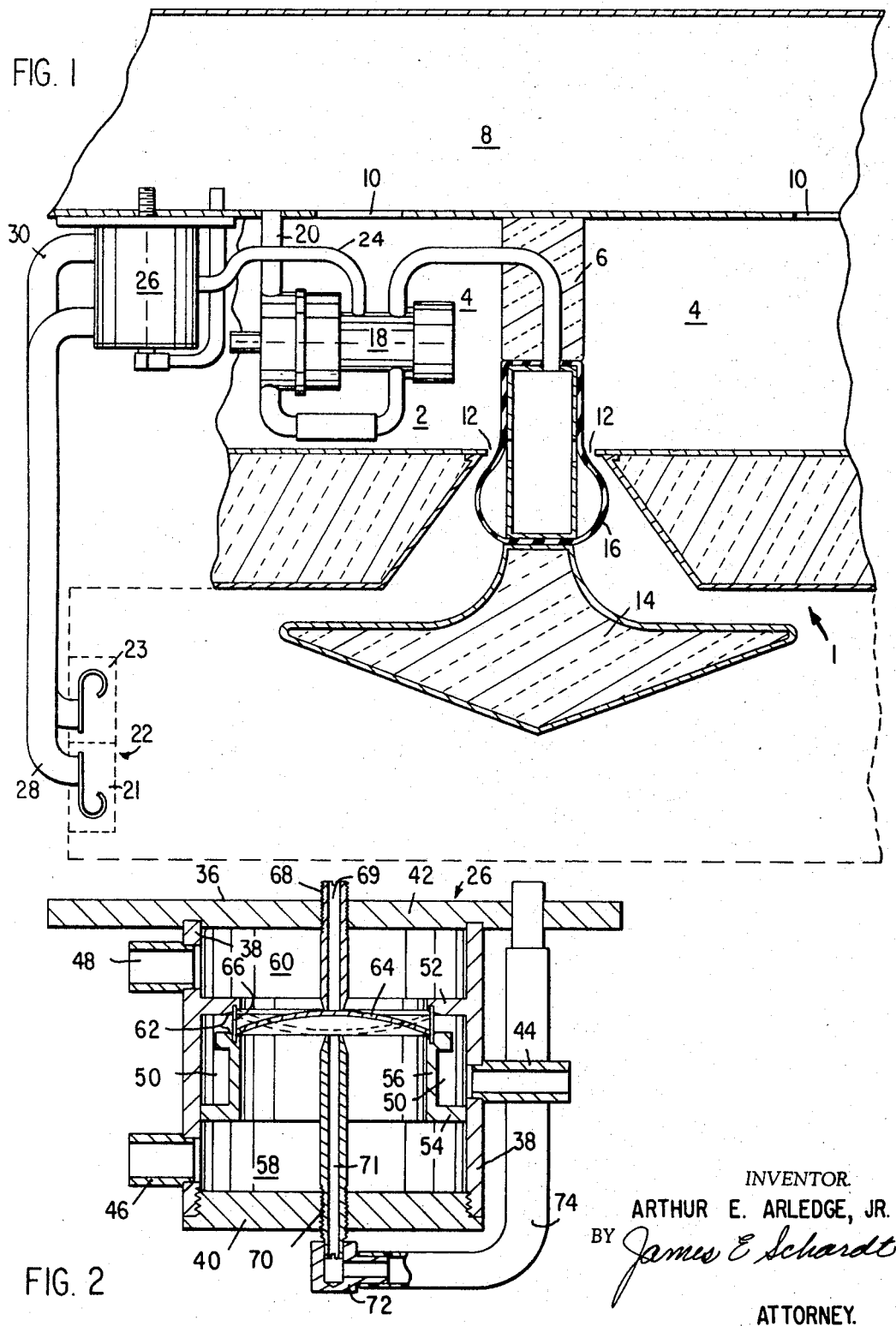

3,450,342
AIR-CONDITIONING APPARATUS
Arthur E. Arledge, Jr., Springfield, N.J., assignor to Carrier Corporation, Syracuse, New York, N.Y., a corporation of Delaware
Filed Dec. 1, 1966, Ser. No. 598,498
Int. Cl. G05d 23/10, 16/04
U.S. Cl. 236—1                      4 Claims

ABSTRACT OF THE DISCLOSURE

A change-over valve for a thermostatically controlled air distributing unit adapted to satisfy a heating or a cooling load. A bimetallic disc disposed in the path of heat exchange medium flowing through the unit diverts control air to a heating thermostat or a cooling thermostat to control the unit according to the temperature of the heat exchange medium flowing therethrough.

---

This invention relates to air-conditioning apparatus. More particularly, this invention relates to a control system for use with a room terminal of an air-conditioning system. Still more particularly, this invention relates to a valve for use in a control system.

In many air-conditioning applications, the area being conditioned may need alternate heating and cooling. In U.S. Letters Patent No. 3,167,253 granted on Jan. 26, 1965 to Richard A. Church and Boris W. Haritonoff, there is disclosed an air distributing unit for discharging conditioned air into an area to be treated. The unit disclosed includes means responsive to the temperature of the treated area to vary the amount of conditioned air discharged into the treated area to maintain the air circulating therein at a constant temperature. The disclosed unit may be used for heating or for cooling depending on the thermostat used therewith. To utilize the air distribution unit for both heating and cooling, the unit can be provided with a cooling bleed thermostat and a heating bleed thermostat or a dual-bleed thermostat, such as disclosed in U.S. Letters Patent No. 3,100,078 granted Aug. 6, 1963 to Richard C. Dreibelbis. With such an arrangement, bleed air is provided to either the heating or the cooling portion of the thermostat. This may be done by a manually operated two-way valve in the bleed air line or by an automatic temperature responsive change-over valve, such as disclosed in U.S. Letters Patent No. 3,165,263 granted Jan. 12, 1965 to Richard C. Dreibelbis.

The primary object of this invention is to provide an improved control system for use in a room terminal air-conditioning system.

Another object of this invention is to provide a change-over valve for use in a control system for a room unit employed with a central air-conditioning system.

The objects of this invention are attained by providing a room terminal control system with a change-over valve having a casing with an inlet and first and second outlets. A bimetallic disk centrally disposed within the valve casing assumes a position therein under the influence of cool air flowing therethrough to provide a passage for the bleed air from the inlet over the disk and out the first outlet while warm air flowing therethrough will cause the disk to assume a position enabling control air from the valve inlet to be discharged from the second outlet.

Other objects and features of my invention will be apparent upon a consideration of the ensuing specification and drawings in which:

FIGURE 1 is a diagrammatic view of a control arrangement embodying the present invention as applied to a room unit forming a part of an air-conditioning system; and FIGURE 2 is a sectional view of the change-over valve.

Referring to FIGURE 1, there is shown a ceiling type room unit 1 of the kind forming a part of the ceiling of a room to be supplied with conditioned air from a central station through the unit, the unit being provided with the change-over valve of the present invention. The room unit includes a plenum effectively divided into chambers 2 and 4 by a partition 6 therein. A supply duct 8 having a plurality of passages 10 communicating with chambers 2 and 4 overlies the plenum and is provided with conditioned air from a central air treating station (not shown). Slots 12 between the partition 6 and the bottom walls of chambers 2 and 4 serve as discharge passages to provide conditioned air to the area served by the unit. A diffuser 14 deflects the air stream from slots 12 to provide an even distribution of the conditioned air throughout the room. A bladder-damper 16 surrounding the lower portion of partition 6 is adapted for various degrees of inflation to control the quantity of air flow through slots 12.

The degree of bladder inflation is controlled by pressure regulator 18. The regulator senses duct pressure through line 20 and primarily controls bladder inflation to maintain a constant air flow through slots 12 irrespective of pressure variations in the supply duct. However, regulator 18 is itself subject to regulation within narrow limits, by bleed thermostat 22, in response to room temperature variations.

For a more complete description of the operation of the room unit, reference may be had to U.S. Letters Patent No. 3,167,253 granted Jan. 26, 1965, to Richard A. Church and Boris W. Haritonoff. The bleed line 24 from regulator 18 rather than connecting directly to a bleed type thermostat, as disclosed in the aforementioned patent, communicates with a change-over valve 26, which in turn communicates with the bleed thermostat 22 by means of lines 28 and 30. The bleed thermostat 22 is comprised of a heating section 21 and a cooling section 23, bleed air fom the regulator being automatically directed by change-over valve 26 to the heating portion of the thermostat when duct 8 is supplied with warm air and to the cooling portion of the thermostat when duct 8 is supplied with cool air.

The change-over valve 26, shown in section in FIGURE 2, has a casing 36 with a cylindrical wall 38, bottom closure member 40 and top closure member 42. An inlet port 44 connected to bleed line 24, a first exhaust port 46, connected to thermostat line 28, and a second exhaust port 48, connected to thermostat line 30, are formed in the side wall 38 of the casing. An inlet chamber 50 within casing 36 in communication with inlet port 44 is formed by a ring shaped top partition 52, a ring shaped bottom partition 54, cylindrical wall partition 56 and a portion of the casing wall 38. The inlet chamber partitions effectively divide casing 36 into the aforementioned inlet chamber 50, a first exhaust chamber 58 and a second exhaust chamber 60. Valve seats 62 formed in the lower portion of ring 52 and the upper portion of partition 56 are adapted for mating engagement with a bimetallic disk 64. The bimetallic disk 64 is adapted to assume the position illustrated in solid lines when subjected to cool air and to assume the position illustrated in dotted lines when subjected to warm air. Centering pins 66 are provided to maintain bimetallic disk 64 in alignment with valve seats 62. Adjustable supports 68 and 70 act as wedges against the convex portions of the bimetallic disk to ensure positive seating of the bimetallic disk periphery with the valve seats 62.

Considering the operation of the change-over valve in conjunction with the air distributing unit and the thermostat when the duct 8 is supplied with cool air and the room is overheated, bleed air from regulator 18 will be supplied to inlet port 44 of change-over valve 26. Bimetallic disk 64, which will be in the position illustrated by the solid lines, will allow the bleed air to pass from inlet chamber 50, through second exhaust chamber 60, exhaust port 48 and line 30 to cooling section 23 of the thremostat 22 sensing room air temperature where it will be bled to the room. When the room has attained the desired temperature, the bleed thermostat will close building up pressure in the control system to raise the pressure in the bladder and restrict flow of air from slots 12.

When warm air is supplied to the unit for room heating, the bimetallic disk will assume the position shown by the dotted lines in response to the increased temperature of the air flowing across the surface of the disk from chamber 50. This will result in bleed air from the regulator passing through inlet chamber 50, second exhaust chamber 58, exhaust port 46 and line 28 to the heating section 21 of thermostat 22. Control of unit 1 is thus automatically switched from one section of thermostat 22 to the other section thereof in response to temperature of the air in supply duct 8.

It should be understood that in a normal installation, the system will be changed from heating to cooling in the spring and back to heating in the fall. We are therefore considering a valve that will be actuated twice a year. While the time required for the bimetallic disk to change from one position to the other is not critical in that the change-over occurs so seldom, it is desirable to minimize this time interval to prevent even a few hours discomfort a year to the occupants of the space being conditioned. For this reason, passageways 69 and 71 in supports 68 and 70 have been provided. Passageway 69 communicates with supply duct 8 directly while passageway 71 communicates with supply duct 8 through fitting 72 and tube 74.

As can be seen from the drawing, when the bimetallic disk is in contact with either support 68 or 70, the passageway associated therewith is blocked so that the only air supplied to the controlling section of the thermostat is air from the regulator. However, air from supply duct 8 is supplied to the non-controlling section of the thermostat by means of the non-blocked support passageway.

Since the heating section of the thermostat will bleed air when the room is too cool and the cooling section of the thermostat will bleed air when the room is too warm, there will be an almost continual flow of air across bimetallic disk 64 to assure a rapid change-over and maintenance of the proper position thereafter.

While I have described a preferred embodiment of my invention, it is to be understood that the invention is not limited thereto but may be embodied within the scope of the following claims.

I claim:
1. A change-over valve for use in a room unit utilizing conditioned air for a control medium and a room air-conditioning medium comprising:
   a valve housing having a control air inlet, a first control air outlet and a second control air outlet, said housing having first and second opposed circular valve seats formed therein,
   a bimetallic disc disposed between said valve seats,
   means associated with said housing for engagement with the periphery of said disc to maintain said disc radially centered with respect to said valve seats,
   first support means associated with said housing for engagement with said disc when said disc warps in response to cool air passing thereover to position said disc so that the edge thereof is in sealing engagement with said first valve seat to provide communication between said control air inlet and said first control air outlet,
   second support means associated with said housing for engagement with said disc when said disc warps in response to warm air passing thereover to position said disc so that the edge thereof is in sealing engagement with said second valve seat to provide communication between said control air inlet and said second control air outlet.

2. A change-over valve according to claim 1 wherein said first and second support means have passages therethrough, means for providing conditioned air to the passages in said support means, said bimetallic disc blocking the passage in said first support means when said bimetallic disc is in engagement therewith, said bimetallic disc blocking the passage in said second support means when said bimetallic disc is in engagement therewith.

3. A change-over valve according to claim 2 wherein said means associated with said housing for engagement with the periphery of said disc includes a plurality of pins disposed in said housing equidistantly spaced around the periphery of said bimetallic disc to maintain said disc centered in relation to said valve seats.

4. A control system for use with a room terminal for an air-conditioning system including a pressure regulator primarily responsive to the pressure of the air supplied to the room terminal to regulate air flow therethrough, a change-over valve operatively associated with said regulator, said change-over valve comprising
   a valve housing having a control air inlet, a first control air outlet and a second control air outlet, said housing having first and second opposed circular valve seats formed therein,
   a bimetallic disc disposed between said valve seat,
   means associated with said casing for engagement with the periphery of said disc to maintain said disc radially centered with respect to said valve seats,
   first support means having a passage therethrough for directing conditioned air into said housing, said first support means being associated with said housing for engagement with said disc when said disc warps in response to cool air passing thereover to position said disc so that the edge thereof is in sealing engagement with said first valve seat to provide communication between said control air inlet and said first control air outlet, said disc blocking the passage in said first support means when said disc is warped in response to cool air passing thereover,
   second support means having a passage therethrough for directing conditioned air into said housing, said second support means being adapted for engagement with said disc when said disc warps in response to warm air passing thereover to position said disc so that the edge thereof is in sealing engagement with said second valve seat to provide communication between said control air inlet and said second control air outlet, said disc blocking the passage in said second support means when said disc is warped in response to warm air passing thereover,
   a bleed type thermostat having a heating section and a cooling section, the cooling section of said thermostat communicating with the said first control air outlet, the heating section of said thermostat communicating with said second control air outlet, the heating section of said thermostat being adapted to bleed air supplied to the housing by the passage in said second support means when the disc is warped in response to cool air passing thereover, the cooling section of said thermostat being adapted to bleed air from said housing supplied thereto through the passage in said first support means when said disc is warped in response to warm air passing thereover.

(References on following page)

References Cited

UNITED STATES PATENTS

| | | | |
|---|---|---|---|
| 1,763,802 | 6/1930 | Levy | 236—34.5 |
| 2,054,997 | 9/1936 | Yang. | |
| 3,100,078 | 8/1963 | Dreibelbis | 236—47 |
| 3,122,201 | 2/1964 | Ashley et al. | 165—26 |
| 3,364,693 | 1/1968 | Jacobs | 62—196 |

EDWARD J. MICHAEL, *Primary Examiner.*

U.S. Cl. X.R.

236—93, 101